No. 879,085. PATENTED FEB. 11, 1908.
F. M. F. CAZIN.
FILAMENT IN ELECTRIC INCANDESCENT LAMPS AND ITS MANUFACTURE.
APPLICATION FILED JUNE 2, 1904.
Fig. 2.
Fig. 1.
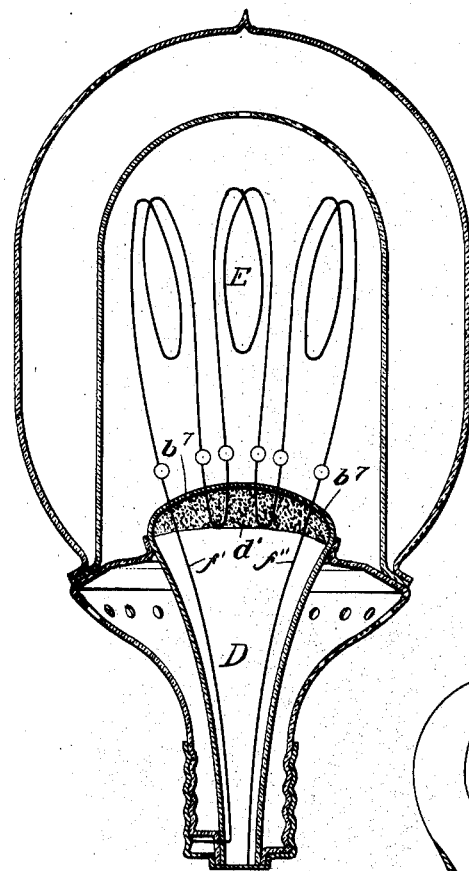
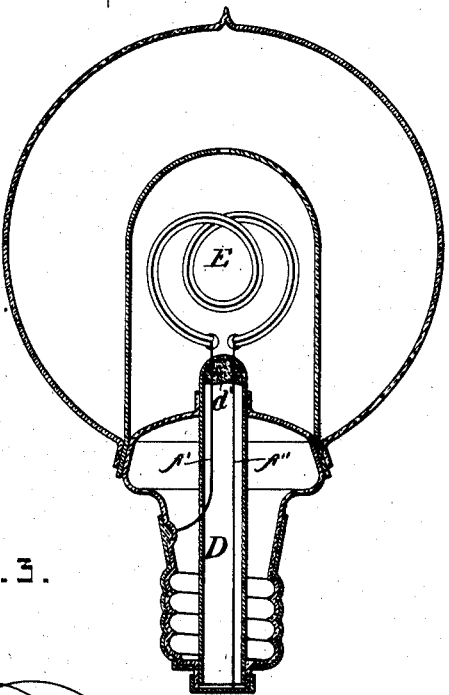
Fig. 3.
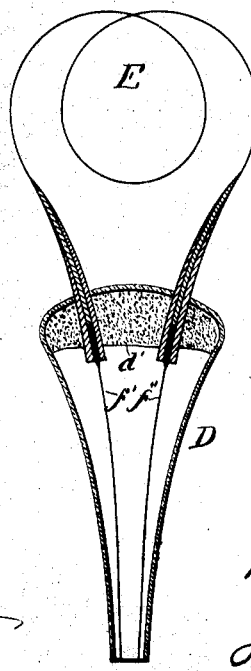
Fig. 4.
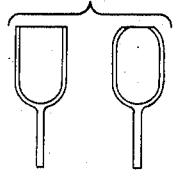
WITNESSES:
F. C. Gibson.
John T. Schrott.
INVENTOR
Francis M. F. Cazin.
BY
Fred G. Dieterich
ATTORNEYS

UNITED STATES PATENT OFFICE.

FRANCIS M. F. CAZIN, OF HOBOKEN, NEW JERSEY.

FILAMENT IN ELECTRIC INCANDESCENT LAMPS AND ITS MANUFACTURE.

No. 879,085.     Specification of Letters Patent.     Patented Feb. 11, 1908.

Application filed June 2, 1904. Serial No. 210,870.

*To all whom it may concern:*

Be it known that I, FRANCIS M. F. CAZIN, a citizen of the United States, residing at 1108 Bloomfield street, city of Hoboken, Hudson county, State of New Jersey, have invented an Improvement in Filaments in Electric Incandescent Lamps and Their Manufacture, of which the following is a specification.

The purpose of the present application is of the same character and in the same line of inventive evolution, as the applications were for the sixteen patents issued to me under Nos. 523,460—, 523,461—, 566,285—, 620,640—, 621,291—, 621,292—, 640,366—, 844,778—, 835,938—, 786,729—, 772,215—, 760,849—, 770,221—, 770,222—, 770,223 and 846,823— and as ten other applications, yet pending, are. They all relate to improvements in electric incandescent lamps and in the methods and processes of their manufacture or to apparatuses used in and for such manufacture. These entire patents with their specifications and claims contain information, which those skilled in the line of electric-incandescent-lamp-making need to appropriate, in order to keep abreast with their art and in order to clearly understand the contents and apply the improvements specified in this application. And my present purpose is mainly to secure patent on certain modifications in my invention, which, though alluded to in some prior application or applications, were not there explicitly enough specified and not sufficiently disclosed for formulating on the stated specification and disclosures the proper claims for their protection by patent, — or which were, under then prevailing rules, divided out of these prior applications on official demand.

I now desire to secure patent for the important, new and useful improvements as by me invented in the matter of the entire and main conductive element in all of its functional parts, including the non-incandescing or in-and out-leading wires, or the parts thereof, which under increased section or in more conductive material constitute the non-incandescing in- and out-leading parts and including the part or parts, which either by less transverse section or by being made of decreased current conductivity quality or of increased current-resistance are heated and made incandescent and including the transition parts from one such functional part to such other functional part or parts, or that, which is called terminals and which has the function of cooling by increased surface and of producing cohesion between parts of different materials and functions, and including the protection of such entire conductive element be it by their chemical insulation or by their surfacing or by their hermetically sealing and including their structure and composition. And I desire to secure protection by patent for my new methods of securing improved functional qualities and increased tenure of function in the entire conductive element or elements of electric incandescent lamps, special attention being paid to the widening out of leading-in and leading-out parts of the conductive element, where different materials of and in such element have their longitudinal contact and where the parts of the conductive element join longitudinally one another. My Patent No. 621292, refers to such terminals, in sundry ways, namely as "the cup-shaped terminals," which as such are illustrated in the drawings, that are part of the application or patent, as mentioned. In the original specification for such patent, filed on October 15, 1897, and bearing the Serial Number 655,312 there occurs on page 7, in the two last paragraphs the following, namely:—

"It having been experienced, that in the incandescent lamps, using rare metal oxids in their luminous body, with or without vacuum, the critical spot is, where the oxids and the filament come in contact with one another, or with the inleading wires, I have devised cup-shaped terminals of the inleading wires for better protection, hermetical inclosure and solid support of the cylindrical luminous body by its ends, and graphitic cement as counteracting or preventing reaction between essential parts.

"This application of a more than commonly secure connection between filament and luminous body of oxids on the one hand and the wire terminals on the other hand is caused by these oxids not being a mere film or coating but there being a real solid tubular body, able to support and strengthen the filament."

In my application No. 709902, of March 21, 1899, on which Patent No. 640366 has been issued on January 2, 1900 "cups or suitable equivalents up-holding the luminant and providing for connection with the inleading wires" were specified and the drawings accompanying the same show these "cups"

or terminals in their relations to the functional parts of the luminant proper. In Figure 1 of the drawings to said patent the chemically insulating cover of the conductive element proper ceases to so insulate before the non-heated part of the conductive element, preferably platinum wires, leave the terminal in the direction towards the base of lamp. And the "cups" is shown as filled with material, that is not identical with the oxids of the luminant proper, the same relation being shown in Figs. 4 and 5. But Figs. 2 and 3 on the contrary show the chemically insulating cover of the conductive element proper to reach beyond the terminals.

While in the cited parts of specification only single terminals and not parallel plural terminals are mentioned, applicant has disclosed his method of employing such plural parallel terminals when in his application of July 24, 1893, (No. 481322) he stated as follows:—

"It is manifest, that the incandescent material may, be arranged on one of several lines, each line terminating in a pair of circuit terminals, which can be connected to separate pairs of inleading wires or to a common pair, as may suit the conditions. This constitutes another point of distinction from the lamps of commerce now in use."

Fig. 1, analogous to Fig. 1 in my Patent No. 640,366 and as shown in my application No. 3061 illustrates the case, when the circuit terminals are connected to one or a common pair of inleading wires. Fig. 2, illustrates the case, when the circuit terminals are connected to separate pairs of inleading wires, though the pairs are in series, while as well they may be separately connected with separate pairs of electric poles. Fig. 3 illustrates a filament with terminals consisting in successively increasing transverse section, in substitution of cup-terminals. Fig. 4 illustrates the cup-terminals in enlarged size.

The terminals, as alluded to in my prior disclosures, and as since further improved, perform the following functions, namely:—

1.) They connect electrically the parts of the conductive element or elements, one class of which parts has the function of conducting an electrical current, such as applied to electric lamps, without offering sufficient resistance to cause essential increase of the temperature in such part or parts, and the other class of which parts has the function of offering sufficient resistance to cause increase of temperature therein to produce incandescence or luminosity.

2.) They protect either class of such parts against chemical reaction on one another, while under electric current. And this protection by the terminals, providing in their composition and structure for chemical insulation (compare my Patent 620,640) as between these parts-classes, viz. by interposing between them some material such as metallic paste, which, preferably aluminium—though a good electric conductor, has no chemical affinity for the material, that constitutes or occurs in either of the connected parts.

3.) They provide for increased and sufficient cooling surface at the above specified critical point, where by experience it is proved that the resistance is the highest and the heat production is locally excessive. To obtain such increased and effective cooling-surface, I have introduced the comparatively large and mainly spherical terminals, such as shown with my application of March 21, 1899, (Patent 640366) and such as shown in Fig. 4 of the drawings that are a part of this present application.

4.) They provide, by holding the ends of filament or filaments firmly to the effect, that they cannot change their position within the terminals, and by means of the cohesive stiffness of the filaments themselves, for so mounting these filaments, that, as plainly shown in Fig. 2. of the drawing accompanying this application, they will in no part come into contact with themselves, but will by a twist given them, when being fastened in the terminals, and at each end in a direction contrary to the direction given the twist at the other end. This function of the terminals rests on the firm hermetical glass-sealing, by me so often described, by the use of melting glass-powder, as also indicated in the drawings, that form part of this specification.

5.) They firmly support, themselves held and supported in turn by the inleading wires, that vary in thickness, according to the special requirements of the lamp, the luminant body or structure proper.

6.) The enlargement of the inleading wires to "cups" or to their equivalents, preferably, as shown of spherical form and leaving a space inside, to be filled with the sundry functional matter and parts as above mentioned, forming a solid entirety, fully apt to perform the functions assigned thereto.

It then remains for applicant to specify his further new improvement in the matter of the conductive element which relates to their hermetical sealing thereof, where they pass into the air-evacuated glass bulb.

In the original application for the hereabove cited Patent No. 621,292, filed on October 15, 1897, itself a division mainly out of some prior applications in its main contents, there occurs on page 6 the following, namely:—

"When the solid body E, intended to become luminous, has been attached to the inleading wires $f'$ and $f''$ in a manner, that will protect the free ends of the inclosed, filament $e'$ against the vehement reaction, produced, where it has its first contact with the platinum of inleading wires and the oxids, namely, by sealing the ends hermetically by means of graphitic cement inside of cupshaped terminals, $e'''$ of the inleading wires $f'$ and $f''$, then I puncture the head $d'$ of the (test) tube D, passing the other ends of the inleading wires through the puncture in their proper length. I then insert powdered glass of proper composition into the end $d'$ of the tube D and perfect the seal around the wires in the glass-blowers' lamp, without destroying the cylindrical form of the tube D any further than at its extreme tip, but maintaining it for subsequent fusing the same concentrically with the '(tubular or cylindrical)' studs $a''$ and $b'$."

I have repeated since then on sundry occasions allusion to the thus stated method of sealing-in hermetically the non-heated part of the conductive element in electrical vacuum lamps. And I desire to direct attention to the fact, that all drawings filed by me of the seals, made with glass-powder, show the closed end of the part (D) in hemispherical or semi-spherical apex and surely not as compressed or squeezed from the outside into a flattened shape, the tip being possibly or exclusively modified by the puncture made for passing the wires.

When a plurality of couples of inleading wires is made instrumental to the current-carrying of the lamp be it with one or more pairs of pole connections the necessity results of giving to the central base part D the form of an inverted bottle with a narrow neck and a wide body with a broad and convex closed end as shown in Fig. 2, and 3, and as called by glass-makers "dew-drops." In such or in similar cases I utilize the powdered glass which is made use of in making joints or the passage of the sundry wires a hermetical seal, and which powder of necessity is then spread over the inside of the glass-face, which fronts toward the luminant of the lamp, for the formation of a light reflecting face. And this is affected by selecting opaque glass for making thereof the said powder. And the utility of the resulting reflector is increased, by selecting its color, or that of the primarily powdered and thereto fused glass, in view of such rays being mainly reflected, which are most desirable in complementing the ray-composition of the luminant to produce as nearly as practicable an agreeable or white light.

Having so far specified the by me preferred form of the practically non-heating part of the conductive element in my improved lamps, applicant now proceeds to disclose certain new and useful improvements in the matter of the material or materials to be used in these lamps for the conductive element at large, be it (as shown in the present art) different from one another in the central or luminant part and in the in-and out-leading parts, or be it eventually as by me newly invented, of mainly and essentially the same material in its entire length, the difference in resistance to current and in consequent production of different temperatures being brought about by difference in transverse section and by other material, the selection that is associated to or with the one functional part and not with the other functional part, or brought about by these causes jointly.

The attempt to make the entire conductive element in electric incandescent lamps of the metal platinum has been made but has failed, because, notwithstanding to the good qualities, that platinum has for being utilized as material for the practically non-heating part of the conductive element, it is not fit to be used by itself as material for the other or luminant part thereof, because at such high temperatures, as occur in the luminant part, it is not form-retaining. It therefore is a useful improvement to utilize the infusible fire-stable metals singly or in alloys of the ruthenium-osmium class, and preferably the natural iridosmin or osmiridium mainly or essentially with or without metal of lower temperature of fusion preferably platinum and with or without other associate materials in and for either part of the length or for the entire length of the conductive elements in electric incandescent lamps.

The part of the conductive element, which is offering the higher resistance to the electric current and which in consequence constitutes its luminant part is preferably made by me of three concentrical parts, namely:— 1, the core; 2, the chemical insulation and mainly, 3, the light emitting surface. And these main parts are not as such essential in every higher-resistance-part of the conductive element, which self-evidently consists of solid matter,—except that it has a "light-emitting surface," as indicated under 3. The "core" and "the higher-resistance-part" may be one or identical, and the "chemical insulation" may not be needed or may have its origin in some inter-reaction between a core and a special surface-matter, just so as the special surface by some reaction on the outer matter may be modified. Or as indicated in my Patent No. 844,778— and in special in its 13. claim, and as indicated in my application of Oct. 15, 1897, and as since continuously reiterated, namely in the following words:

"I consider as my invention the arrangement of a carbon-filament to form the negative pole in an electrolytic bath in a loop-shape, similar to the shape, in which it is to be used in the lamp, without direct connection with the positive pole (such as used in the common flashing process). And I consider as part of my invention the thereto adapted form of the metal, used as the positive pole in the bath, by which form the carbon-loop is surrounded in close proximity and mainly uniform distance by a plate of metal, that acts as the positive pole, which plate or metal is continuous to itself and to the positive pole," and in the claim, namely:

"12. The method of electrolytically precipitating a solid coat on a carbon-filament, by attaching both ends of the filament to the negative pole of the electrolytic apparatus, immersing the filament-loop into the electrolyte and surrounding the same at some distance with a metal cathode of such form as is adapted to face the filament at uniform distance mainly." (Compare: testimony in behalf of Cazin in interference—proceedings No. 24,614—page 6.)

The core itself may be constituted of some conductive material in the form of a filament, bent into the shape intended for it to possess in the finished lamp; such core being then further electrolytically plated.

And yet one other method for building up my improved glowers and filaments, may be described as follows: I had fully ascertained, that the infusible (at the temperature of the white-incandescing glower) metals improved in conductivity, when alloyed with one another,—but even as such and as stated, they were deficient in cohesiveness and ductility. For reasons of similarity in specific gravity as well as of atomic proportion platinum has heretofore been ranged as of one group with the more infusible metals osmium, iridium, etc. but of all of these platinum exclusively had been tested in the earlier stages of electric light-construction and had proven unavailable on account of its fusion at or slightly below its temperature of white incandescence. Withal platinum possessed the so much wanted cohesiveness in electrolytic deposit and otherwise. It was therefore a very natural evolution of my invention, that I should use platinum in a natural fraction of the alloy as a corrective to render the natural iridosmin more available for my purpose. To render this practicable,—I had to determine on an electrolyte, in which the different metals to the alloy-deposit were in an analogous composition,—that they all might be reacted upon by the electric current in an analogous as well as proportionate manner. There is then one kind of a solution, fit to serve as electrolyte, in other words,—answering the requirements, as hereabove by me specified.,—namely the analogously composed chlorids of potassium or sodium in the salts: 1, osmium-potassium chlorid; 2, iridium-potassium chlorid; 3, platinum-potassium chlorid, as well as the salts of sodium-chlorid with the three different similar high-fusion metals.

All six salts are prepared by the Wohler process, such as well known in chemical art and science, but mainly being the process of decomposing infusible metals in a current of chlorin.

In the natural iridosmin the proportion of the two metals is not found to be harmonious with a composition in proportion as indicated by their atomic weights. I found it sufficient in practice to add solution of iridium-chlorid, until the deposit assumed its satisfactory appearance and qualities,—a remedy adapting itself well to the different composition of natural iridosmin. It is further self-evident, that the specified metals that form as such the anode, must there be as nearly as practicable, in proportions, that are analogous to their atomic weights, though they may be present as of different relative valenzial relation.

With the anode in the shape of fine division (powder) and properly proportioned the deposit is a true alloy and does not discard the one metal after the other in an eventual sintering process, as the alloy reaches the different points of fusion of the single metals, but has a very high fusion-temperature common to all as their alloy. This temperature is above their temperature of white incandescence, as by me practically proven, in other words it fully answers the purpose of being made into luminants for electric incandescent lamps;—the vacuum being eventually the necessary protection against combustion of the osmium, which protection may also eventually be intrusted to a coat or cover of rare-metal-oxids either exclusively or conjointly with the vacuum. Incidental to this operation is the eventual necessity to temporarily increase the cohesiveness of the deposit, and to prepare for subjecting the deposit to successively increasing current and temperature to the end of producing white or even blue-white incandescence. And such increase of cohesiveness, be it for intermediate service or for permanent, I produce in sundry ways, but mainly by a flashing of the luminant resulting in a deposit of a coat of more cohesiveness than that of the stated part of the conductive element, such as a coat of carbon or of any other functionally suitable material.

That I have mentioned a vacuum as eventual protection of and for my improved filament or glower mainly consisting of a practically infusible alloy of metals of the platinum—group, so called,—does not be intended to indicate, that I may not as well use an atmosphere, be it permanent or continuously supplied of some stable or unstable gas or gases in connection with my improved metal-filaments, such as hydrogen, or a gaseous or vaporous hydro-carbon. And in connection therewith in an inner bulb, I may use an outer or extra bulb or bulbs and air-exhaust the space between the inner and outer bulbs for the purpose of heat-conservation and protection.

My specification of my preferable selection as to ingredients or components of the by used electrolytic baths would not be complete, should I omit to state, that many modifications in the composition thereof may be made to serve special purposes as to the final character of the metal etc. luminant. So for instance I may use in place of the potassium-chlorid in the solution of double-metal-chlorids the osmiate of potassium etc., in which case I further dilute the electrolyte to leave it but slightly alkaline. It then remains to speak of method and manner of passing the conductive element into or out of a glass-inclosed space, which may be air-exhausted or be filled with inert gas or with gaseous or vaporous hydro-carbon etc., out of or into a space within and filled with atmospheric air. My manner and method differs in this from the old art, that instead of selecting the wire-metal to conform, as platinum does in coefficients of contraction and expansion with the glass;—I compound the glass-mass to produce a glass, the said coefficients of which conform with those of my conductive element, where it passes the glass and where a hermetical seal is intended.

Applicant has in experimenting ascertained, that longevity of the conductive element and lamp is fostered by expanding the protection of such element over and beyond the immediate requirement of hermetical sealing, by prolonging the glass-embedding beyond the seal proper or beyond the passage through glass-walls, that adjoin. (Compare Fig. 3.)

Nature has made chary distinction as between metals, which in their pure metallic state and at normal temperature may be mechanically powdered, (compare my Patent No. 523,460 page 2, 121 line) and those which may not be so powdered, but the metals by me specified as of the ruthenium-osmium class (compare my application No. 704,218) are not only so powderable exclusively but they also are practically infusible and therefore they are peculiarly adapted to be used in electrical luminants, as has by me been practically proven. As the metals, that belong to the class, by me preferred in making up my improved filaments, I nevertheless abstained from specifying exclusively those of the rutheniumosmium class, but I specified them in my prior application as "infusible oxygenizable", as "metal having affinity for oxygen and high point of fusion". (Compare the claims in my Patent No. 835,938 issued on my application of Febr. 2, 1899, on Nov. 13, 1906, as well as lines 41 to 55) and as such metals I also specified "wolfram" (tungsten) "uranium, manganese, rhodium, iridium and thorium," and nowhere has their number been limited but by their cited natural qualities. Tin is also mechanically powderable but only at the high temperature of 200° C. and also it is almost the only metal which forms a true alloy with those powderable and infusible metals. Of this tin-pulverization I take advantage in mixing the powdered infusible metals in proper or suitable proportions with pulverized tin and eventually with pigment admixture. This mixture I may use in the form of fine powder or I may add to the mixture eventually collodion or glycerin or both or some volatile oil or other matter to make a paste of plastic or liquid consistency. In proper consistency this metallic paste is squirted, and preferably so into the inside of a glass tube of suitable dimensions. I may aid in such filling by air exhaustion of the tube or by air pressure on the paste or by both, at different ends of the tube. Mainly avoiding other than metallic components, I may also fuse and cast the specified alloy with or without admixtures into the tube-channel of a preferably U-shaped glass-tube, using pressure and suction (air-exhaustion) on the molten metal etc., on the opposite ends of the heated tube. It should then be understood, that the transverse section of the glass-tube used in such manipulation has been selected or determined on the ground, that the wire or filament or conductive element therein primarily formed or formable be at least of such transverse section, that the lamp-current may pass the same, without practically or perceptibly heating the same, or be adapted to the function of in- and out-leading of electric current of suitable function. It then remains to draw out, roll out, thin out the central part or parts of the tube and fillet to a reduced section adapted to be heated by said current mainly by the aid of heating both tube and fillet, until this central part has been reduced in transverse section to sufficiently minute size to offer to the lamp-current all the resistance, that is required under suitable current tension to become incandescent or luminous. Such condition thereof may be ascertained by known proper means without the fillet leaving the tube. And again such passing of suitable tension-current in the indicated manner is made instrumental to produce sundry useful effects such as the carbureting of metals or as the discarding, if present, of metals of lower temperature of fusion or even of the remaining portion of the glass-tube or embedding from the central part of the conductor. Precaution must be taken against oxygenation of the fillet, eventually by handling the same *in vacuo*. (Compare my application No. 141,501 for bell jar inclosed plating apparatus, etc.)

In the matter of discarding from the fillet-alloy the metals of lower temperature of fusion it should be understood, that it has been observed by me, that in heating the tube to differential temperatures, and mainly the central part to a higher temperature than the end parts, the low fusion point metal withdraws from the central part into the end parts, where they need not be discarded but may there even aid in the befitting thereof to conducting without practical heat production.

It further remains for applicant to state his method of building up of different metals, the in and out-leading parts of his improved conductive element as well as the central part thereof viz., the luminant part, and one of his preferred methods as applied to the effect of securing long hermetical seals such as by him described.

It is a matter of known art, to select platinum as the metal of which to make inleading wires be it exclusively or in part. And it has been customary to make the hermetical seal mainly around platinum-parts of inleading wires and patent has been issued (No. 444530) on sealing, in the same seal, two metals and for sealing all of the platinum parts into the seal, while different metal is used both inside of the bulb and outside of the seat.

It is applicant's selection and method to make the main or entire length of the conductive element in the lamp of mainly the same metal or of the same metals or of an alloy mainly of the same character, though in the making of different parts functional differences in composition as well as in transverse section may be effected. And in carrying out this selection or method the following conditions are complied with, namely:

1. Equal expansion and contraction with the glass that forms the seal the equalization being effected by adapting the composition of the seal-glass to the expansion and contracting qualities of the selected metal and 2. Practical infusibility in the central or luminant part with proper provision for cooling the intermediate or terminal parts between central and end parts to a non-form-destroying temperature.

3. Sufficient transverse section of the end parts of the conductive element to mainly conduct the electric current as employed in the lamp without resistance to the current to effect practical heating thereof.

I now shall describe a method for making wires of these infusible metals mainly of the osmium-ruthenium class.

In one of my applications for patent on electric incandescent lamps, filed on Feb. 2, 1899 and allowed on March 22, 1901, I claimed filaments made in part or wholly of one or of more of these metals. I now make of these metals mainly a continuous conductive element for my improved electric vacuum lamp, and I pass from the practically non-heated part, which I preferably not only hermetically pass through the glass seal but which I coat throughout with glass, to the luminant part thereof by means of reducing by degrees the transverse section of the conductor thereby increasing its resistance to current, between points where the luminant part proper of the conductor begins and ends. And I now describe more specifically one of the sundry processes by me employed for producing a continuous conductive element, having different functions in different parts thereof, namely the method of casting the stated metals into a wire, though I may also treat all the compound parts as a mixture in the form of fine powder. I produce an alloy of the infusible metal or metals with tin or any other suitable metal and cast a wire of suitable minute transverse section in a heated vertical U-shaped glass-tube aiding in the purpose by exhausting the air from the other end of the tube, while the molten alloy, by means of a funnel-expansion is poured into the other end and by adding eventually pneumatic pressure at the pouring-in-end, while the liquid alloy is entering the tube mainly by means of its own gravity.

As long as the tube is of sufficiently high temperature to keep the alloy liquid or plastic the tube together with the cast wire can be drawn out to decreasing transverse sections. In such drawing out operation by hand or under suitable rolling pressure the alloy and the plastic glass may be made to adhere to one another or to readily part from one another according to the provision made prior to the inserting of the metal into the glass tube in the way of producing either effect by a suitable coating of the tubular interior.

When I desire to cause ready parting I prepare a borax coating thereof by evaporating a borax solution on the interior wall by revolving the tube containing such solution until complete evaporation of the solvent has taken place.

When I desire to cause adhesiveness, the preferable case I prepare the tubular inside by the use of fluoric acid to become comparatively roughened and by treating the so roughened glass-face with a material of stronger basic effect than the base used in the composition of the glass, as for instance caustic potash against oxid of lead.

The thus prepared tubes are ready to be used as molds for the cast wire and the alloy for causing the wire is preferably composed of 9 parts infusible metal and one part platinum and I may add asphaltum bitumen to cause porosity and to act as temporary pigments.

I do not confine myself in the carrying out of these new and improved methods exclusively to these metals named but I may use other metals in alloy therewith, or use some of them and others not. Neither do I in thus making wire luminants confine myself to the exclusive use of these metals, but I may use co-jointly with them, be it as core or as coatings rare-metals and their oxids also.

That which I claim as my invention, is:—

1. A filament in an electric incandescent lamp which filament consists of a core, which is an electrolytically metalized carbon-fillet, and of concentrical layers thereon, the transverse section of the two ends of which filament increase to a thickness at the extreme ends, which thickness increases the conductivity of the filament to the effect, that the terminals do not become heated under current.

2. A filament in an electric incandescent lamp, which consists of a central core and of adhesive concentrical layers thereon, the layers consisting of electrolytical deposits, and the ends of which filament increase in thickness towards the terminals.

3. A filament in an electric incandescent lamp which consists of a central core and of adhesive concentrical layers, the layers consisting of electrolytical deposits, being thicker at the ends of the filament than along its central main part.

4. The method of manufacturing filament in electric incandescent lamps, which method consists in electrolytically plating on a core an adhesive concentrical coating of metal.

5. The method of manufacturing filaments in electric incandescent lamps, which method consists in electrolytically plating on a central core an adhesive coat, which consists of layers of metal.

6. The method of manufacturing filaments in electric incandescent lamps, which method consists in electrolytically plating on a carbon-core an adhesive concentrical coating of metal.

7. The method of manufacturing filaments in electric incandescent lamps, which method consists in electrolytically plating on a central core an adhesive concentrical metal-coating to the effect, that the plated filament is thicker near its end than in its main middle-part.

8. The method of manufacturing the filament for electric incandescent lamps, which consists in electrolytically plating concentrical layers on a central core.

FRANCIS M. F. CAZIN.

Witnesses:
   CHAS. C. WASHBURN,
   MINNA E. CAZIN.